United States Patent
Kaufmann

(10) Patent No.: US 6,667,122 B2
(45) Date of Patent: Dec. 23, 2003

(54) FUEL CELL SYSTEM HAVING A HEAT EXCHANGER

(75) Inventor: Lars Kaufmann, Kirchheim (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 257 days.

(21) Appl. No.: 09/921,312

(22) Filed: Aug. 3, 2001

(65) Prior Publication Data

US 2002/0028364 A1 Mar. 7, 2002

(30) Foreign Application Priority Data

Aug. 3, 2000 (DE) .......................... 100 37 825

(51) Int. Cl.$^7$ ............................ H01M 8/02; H01M 8/04
(52) U.S. Cl. ................... 429/17; 429/20; 429/26
(58) Field of Search ........................ 429/26, 17, 20

(56) References Cited

U.S. PATENT DOCUMENTS

| | | | | |
|---|---|---|---|---|
| 4,352,863 A | * | 10/1982 | Maru | 429/17 |
| 4,670,359 A | * | 6/1987 | Beshty et al. | 429/17 |
| 5,344,721 A | | 9/1994 | Sonai et al. | 429/20 |
| 6,120,923 A | * | 9/2000 | Van Dine et al. | 429/17 |
| 6,551,732 B1 | * | 4/2003 | Xu | 429/20 X |

FOREIGN PATENT DOCUMENTS

| | | |
|---|---|---|
| DE | 36 88 990 | 6/1986 |
| DE | 195 45 186 | 12/1995 |
| DE | 197 27 588 | 6/1997 |
| DE | 197 54 013 | 12/1997 |
| DE | 198 22 689 | 5/1998 |
| DE | 198 22 691 | 5/1998 |
| DE | 198 32 389 | 7/1998 |
| DE | 199 03 168 | 1/1999 |
| EP | 0 861 802 | 9/1998 |
| WO | WO 00/04600 | 1/2000 |

* cited by examiner

Primary Examiner—John S. Maples
(74) Attorney, Agent, or Firm—Crowell & Moring LLP

(57) ABSTRACT

A fuel cell system includes (1) a heat exchanger for pre-heating a fuel/water mixture; (2) an evaporator unit for generating a starting-material gas flow from the preheated fuel/water mixture; (3) a gas generation unit for producing a hydrogen-rich gas containing carbon monoxide from the starting-material gas flow; (4) a gas cleaning unit for selective removal of carbon monoxide from the hydrogen-rich gas; (5) a cooling unit for the gas cleaning unit; and (6) at least one fuel cell comprising an anode chamber through which cleaned, hydrogen-rich gas flows, a cathode chamber through which an oxygen-containing medium flows, and a cooling space through which a coolant flows. The heat exchanger, through which the cleaned, hydrogen-rich gas flows, is arranged downstream of the gas cleaning unit. Alternatively, the heat exchanger is arranged downstream of the cooling space and through which the coolant flows.

5 Claims, 1 Drawing Sheet

FUEL CELL SYSTEM HAVING A HEAT EXCHANGER

BACKGROUND AND SUMMARY OF INVENTION

The present invention relates to a fuel cell system having (1) an evaporator unit for generating a starting-material gas flow from the preheated fuel/water mixture; (2) a gas generation unit for producing a hydrogen-rich gas containing carbon monoxide from the starting-material gas flow; (3) a gas cleaning unit for selective removal of carbon monoxide from the hydrogen-rich gas; (4) a cooling unit for the gas cleaning unit; and (5) at least one fuel cell comprising an anode chamber through which cleaned, hydrogen-rich gas flows, a cathode chamber through which an oxygen-containing medium flows, and a cooling space through which a coolant flows.

As fuel, conventional fuel cells use hydrogen, which is produced from a mixture of a liquid fuel (for example, methanol), and water in stages connected upstream of the fuel cell. Since the production of the hydrogen usually also entails the formation of carbon monoxide, which is damaging to the fuel cell, a gas cleaning unit is additionally incorporated so that substantially pure hydrogen acts on the anode side of the fuel cell. Further, an evaporator unit is provided for evaporating the fuel and/or water. Finally, to avoid environmental pollution, an exhaust-gas treatment unit is provided, in which all the combustible constituents of the fuel cell exhaust gases are converted as completely as possible.

A fuel cell system of the generic type is known from EP 861 802 A2. In this fuel cell system, all the subsystems, such as a preheater for a fuel/water mixture, an evaporator, a gas generation unit, a gas cleaning unit and exhaust treatment are integrated in a common arrangement of plates. In this case, the gas cleaning unit is arranged adjacent to the preheating unit, for the purpose of dissipating the thermal energy produced during the gas cleaning.

A drawback of this system is the fact that the thermal energy which can be taken up by the fuel/water mixture is not sufficient under all operating conditions to adequately cool the gas cleaning stage, and consequently undesirable temperature peaks still arise in the fuel cell. A further drawback is that the fuel/water mixture is at least partially evaporated as early as at the preheating unit, so that a phase mixture of liquid and gaseous fuel and/or water flows through the preheating unit. However, the heat capacity of the cooling medium is highly dependent on its state, and consequently, under certain circumstances, there is insufficient cooling capacity available in regions with gaseous coolant, and therefore local overheating may occur.

U.S. Pat. No. 5,344,721 discloses a fuel cell system in which fuel and water are supplied separately. In this case, separate preheating units and evaporators are provided for the fuel and the water. Therefore, in this arrangement a large number of components are required, which is unacceptable in particular for mobile applications in view of the space available, costs, and weight.

It is an object of the present invention to provide a fuel cell system which is of compact structure, has improved system efficiency, and ensures a reliable heat balance both for the gas cleaning unit and for the fuel cell.

This object is achieved by a fuel cell system according to the present invention.

The combination of a gas cleaning unit with an associated cooling unit and a heat exchanger connected downstream of the gas cleaning unit for the purpose of preheating the crude fuel/water mixture makes it possible to ensure that, even in the event of load changes, the hydrogen-rich, cleaned gas fed to the anode chamber of the fuel cell is at a temperature which is appropriate for the fuel cell. Unacceptable temperature peaks are therefore avoided. At the same time, this energy which is extracted from the hydrogen-rich, cleaned gas is fed to the crude fuel/water mixture. This reduces the evaporator capacity required and improves the efficiency of the system. At the same time, the load, in particular thermal stresses, on the evaporator unit is reduced by the reduction in temperature gradient. In this way, the service life and the dynamic performance of the evaporator unit can be improved. Compared to systems with separate fuel and water feeds, it is possible to eliminate the need for at least a preheater unit or an evaporator unit.

Making the coolant emerging from the fuel cell act on the heat exchanger has the advantage that the load on the coolant circuit of the fuel cell is relieved, and consequently a second heat exchanger has to dissipate less thermal energy. This heat exchanger can therefore be of smaller design, which is desirable in particular for mobile applications. At the same time, in this arrangement too, the thermal stresses in the evaporator unit are reduced and the efficiency of the system is improved.

Moreover, the coolant circuit of the fuel cell can also be used to cool a further heat exchanger designed as a reformate cooler. In this case, it may be necessary for a further heat exchanger, which is acted on by a cooling medium, also to be provided between the preheating unit and the reformate cooler. With this arrangement too, it is possible to ensure a reliable heat balance both for the gas cleaning unit and for the fuel cell. At the same time, the efficiency of the system is improved by the preheating unit and the load on the evaporator unit is reduced.

Other objects, advantages and novel features of the present invention will become apparent from the following detailed description of the invention when considered in conjunction with the accompanying drawings.

DETAILED DESCRIPTION OF THE DRAWINGS

Figure 1:
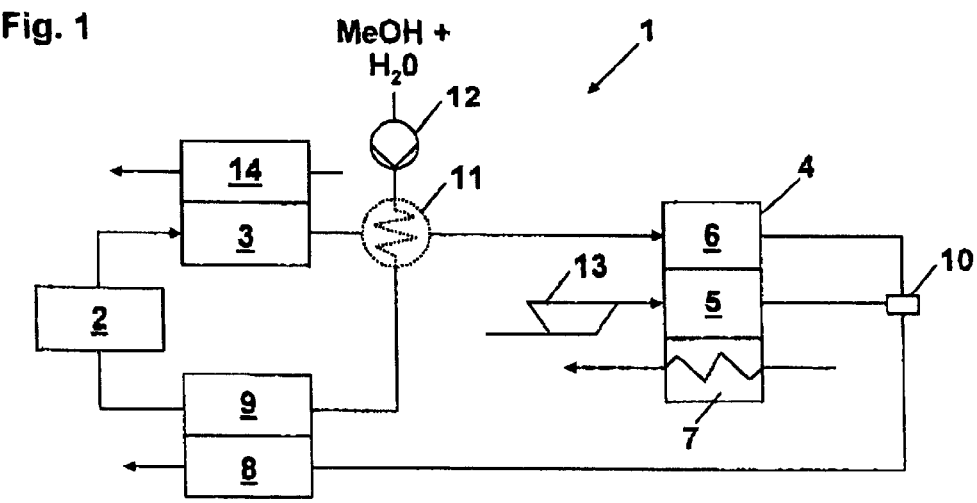
FIG. 1 shows a first embodiment of a circuit diagram of a fuel cell system according to the present invention.

The fuel cell system shown in FIG. 1, which is denoted overall by 1, has a heat exchanger 11, an evaporator unit 9, a gas generation unit 2, a gas cleaning unit 3 and a fuel cell 4 with an anode chamber 6, a cathode space 5 and a cooling space 7. Furthermore, a catalytic oxidation unit 8 is provided. A metering pump 12 is used to convey a crude fuel/water mixture out of a storage tank (not shown). The crude fuel/water mixture is preheated in the heat exchanger 11 and is then evaporated in the evaporator unit 9, the evaporator unit 9 being heated directly or indirectly by the oxidation unit 8 or in some other way. In the heat exchanger 11, the crude fuel/water mixture is heated by thermal contact with the hydrogen-rich, cleaned gas emerging from the gas cleaning unit 3. In this process, the hydrogen-rich, cleaned gas is simultaneously cooled, so that the heat exchanger 11 simultaneously acts as a reformate cooler. In this case, the hydrogen-rich, cleaned gas is cooled to temperatures which are suitable for the fuel cell 4.

A hydrogen-rich gas is generated in the gas generation unit 2 from the gaseous fuel/water mixture and, if appropriate, air by partial oxidation and/or steam reforming. If heating is required for the gas generation unit 2, this can take place directly or indirectly via the oxidation unit 8;

through thermal contact with the gas cleaning unit 3; or in some other way. Carbon monoxide, which is harmful to the catalysts present in the anode chamber 6 of the fuel cell 4, is usually also contained in the hydrogen-rich gas. For this reason, a gas cleaning unit 3 is provided between the gas generation unit 2 and the anode chamber 6 of the fuel cell 4. This gas cleaning unit 3 is preferably a device for the selective catalytic oxidation of the carbon monoxide with the addition of oxygen. However, it is also possible to use other suitable gas cleaning units 3, for example a membrane cleaning unit. The gas cleaning unit 3 is in thermal contact with an associated cooling unit 14. This cooling unit 14 can be cooled, for example, with the aid of a suitable coolant. Alternatively, it is also possible for the gas cleaning unit 3 to be cooled through contact with an endothermic reaction. In this case, by way of example, the cooling unit 14 may also be designed as a gas generation unit in which endothermic steam reforming takes place. The cooling unit alone dissipates a large part of the thermal energy from the gas cleaning unit 3. The heat exchanger 11 is used in particular to avoid temperature peaks and, at the same time, constitutes a thermal safety reserve for protecting the fuel cell 4.

A compressor 13 is used to supply an oxygen-containing gas, preferably ambient air, under pressure to the cathode space 5 of the fuel cell 4. Alternatively, the fuel cell 4 may also be supplied with ambient air at ambient pressure with the aid of a fan. A suitable coolant, preferably a water/glycol mixture, flows through the cooling space 7 of the fuel cell 4. In this process, the fuel cell 4 is held at a predetermined operating temperature. The embodiment only shows the basic structure of a fuel cell 4. The precise structure of a fuel cell 4 of this type or of a fuel cell stack, as well as the appropriate arrangement of one or more cooling spaces 7, is known from the prior art and is therefore not explained in more detail.

After flowing through the fuel cell 4, the anode exhaust gas is mixed with the exhaust air from the cathode space 5 in a mixing element 10 and is fed to the catalytic oxidation unit 8, where all the combustible constituents of the fuel cell exhaust gases are reacted as completely as possible at a suitable catalyst, preferably a precious metal catalyst. Instead of the cathode exhaust gas, it is also possible for another oxygen-containing gas to be admixed with the anode exhaust gas downstream of the catalytic oxidation unit 8.

Naturally, the evaporator unit 9, the gas generation unit 2, the gas cleaning unit 3 or other components of the fuel cell system 1 may also be of multistage design.

The combination of a gas cleaning unit 3 with separate cooling unit 14 and a heat exchanger 11 for preheating the crude fuel/water mixture makes it possible to ensure, even if the event of load changes, that the hydrogen-rich, cleaned gas fed to the anode chamber 6 of the fuel cell 4 is at a temperature level which is appropriate for the fuel cell 4. Unacceptable temperature peaks are thereby avoided. At the same time this energy which has been withdrawn from the hydrogen-rich, cleaned gas is fed to the crude fuel/water mixture. This reduces the evaporate capacity required and improves the efficiency of the system. Furthermore, the load, in particular thermal stresses, on the evaporator unit 9 is lowered by the reduced temperature gradient. In this way, the service life and the dynamic performance of the evaporator unit 9 can be improved. Compared to systems with separate fuel and water supply, it is possible to eliminate the need for at least a preheating unit or an evaporator unit.

Figure 2:
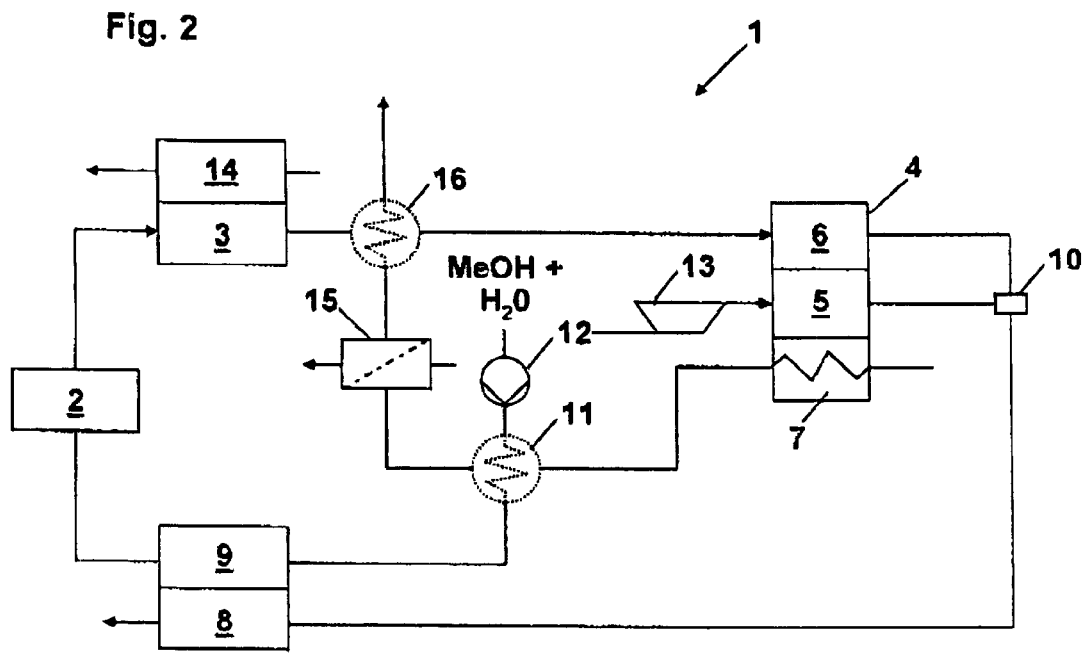
FIG. 2 shows a second embodiment of a simplified circuit diagram of a fuel cell system according to the present invention.

A further embodiment of a fuel cell system according to the present invention is shown in FIG. 2, in which identical parts are denoted by identical reference numerals. Unlike FIG. 1, in this arrangement the heat exchanger 11 is acted on by the coolant of the fuel cell 4, the coolant being fed to the heat exchanger 11 downstream of the cooling space 7. In this case, therefore, the crude fuel/water mixture is preheated not by the hydrogen-rich, cleaned gas from the gas cleaning unit 3 but rather by the hot cooling medium from the cooling space 7, before it is guided into the evaporator unit 9. In this embodiment, a further heat exchanger 15 is additionally arranged downstream of the heat exchanger 11 in the coolant flow of the fuel cell 4. This further heat exchanger is additionally acted on by a cooling medium, preferably ambient air. As a result, the temperature of the coolant is reduced further before it then passes into a third heat exchanger 16, which serves as a reformate cooler. Then, by this third heat exchanger 16, the hydrogen-rich, cleaned gas emerging from the gas cleaning unit 3, before entering the anode chamber 6, is once again cooled to a temperature which is appropriate for the fuel cell 4. The need for the second heat exchanger 15 is dependent on the operating conditions in the fuel cell system. If, after flowing through the heat exchanger 11, the coolant is already at a sufficiently low temperature under all operating conditions, it is also possible to dispense with the second heat exchanger 15.

This arrangement has the advantage that the load of the coolant circuit of the fuel cell 4 is relieved, so that the second heat exchanger 15 has less thermal energy to dissipate. This second heat exchanger can therefore be of smaller design, which is desirable in particular for mobile applications. At the same time, in this arrangement too, the thermal stresses in the evaporator unit 9 are reduced and the efficiency of the system is improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system, comprising:

a heat exchanger for preheating a fuel/water mixture;

an evaporator unit for generating a starting-material gas flow from the preheated fuel/water mixture;

a gas generation unit for producing a hydrogen-rich gas containing carbon monoxide from the starting-material gas flow;

a gas cleaning unit for selective removal of carbon monoxide from the hydrogen-rich gas;

a cooling unit for the gas cleaning unit; and at least one fuel cell comprising an anode chamber through which cleaned, hydrogen-rich gas flows, a cathode chamber through which an oxygen-containing medium flows, and a cooling space through which a coolant flows, wherein the heat exchanger is arranged downstream of the gas cleaning unit and through which the cleaned, hydrogen-rich gas flows.

2. A fuel cell system according to claim 1, further comprising a catalytic oxidation unit in thermal contact with at least one of the evaporator unit or the gas generation unit.

3. A fuel cell system according to claim 2, further comprising a line for an exhaust gas from the anode chamber and an exhaust gas from the cathode chamber to the catalytic oxidation unit.

4. A method for operating a fuel cell system, comprising:

preheating a fuel/water mixture via a heat exchanger;

evaporating the preheated fuel/water mixture, thereby generating a starting-material gas flow;

producing a hydrogen-rich gas containing carbon monoxide from the starting-material gas flow; and removing carbon monoxide from the hydrogen-rich gas, thereby producing cleaned hydrogen-rich gas;

directing the cleaned hydrogen-rich gas through the heat exchanger, thereby cooling the cleaned hydrogen-rich gas and effecting preheating of the fuel/water mixture; and directing the cooled cleaned hydrogen-rich gas to an anode space of at least one fuel cell, wherein the heat exchanger is arranged downstream of the gas cleaning unit.

5. A method according to claim 4, further comprising catalytically oxidizing cathode exhaust gas and anode exhaust gas from the at least one fuel cell in a catalytic oxidation unit that is in thermal contact with at least one of the evaporator unit or the gas generation unit.

* * * * *